Figure 1:
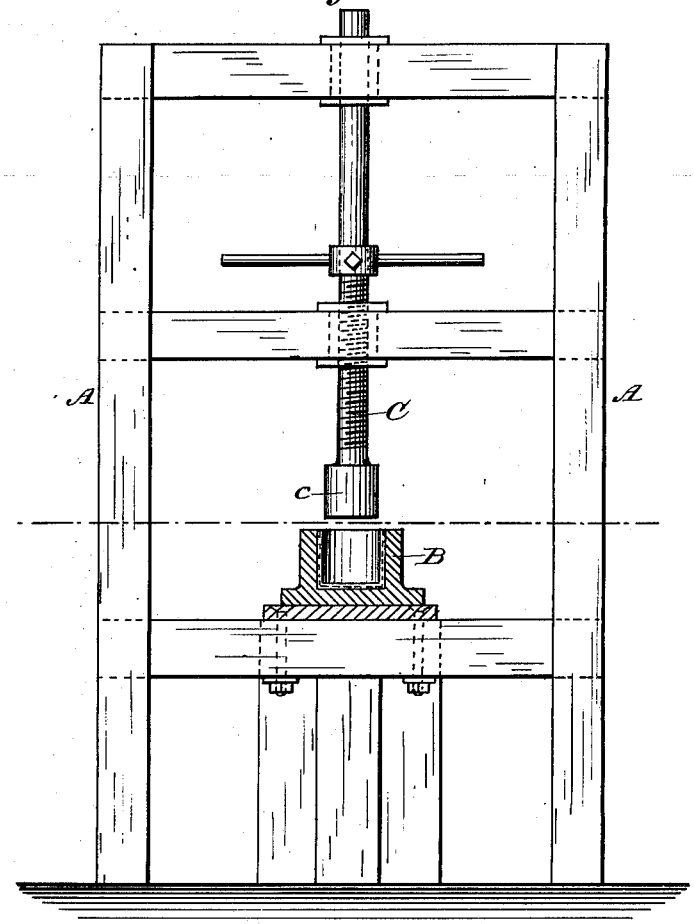

(No Model.) 2 Sheets—Sheet 1.

C. HEMJE & T. C. BRECHT.

PROCESS OF AND APPARATUS FOR COMPRESSING PLASTIC AND OTHER MATERIALS.

No. 261,228. Patented July 18, 1882.

WITNESSES
INVENTORS:
Charles Hemje, &
Theodore C. Brecht,
By T. C. Brecht
Attorney (No Model.) 2 Sheets—Sheet 2.
C. HEMJE & T. C. BRECHT.
PROCESS OF AND APPARATUS FOR COMPRESSING PLASTIC AND OTHER MATERIALS.
No. 261,228. Patented July 18, 1882.
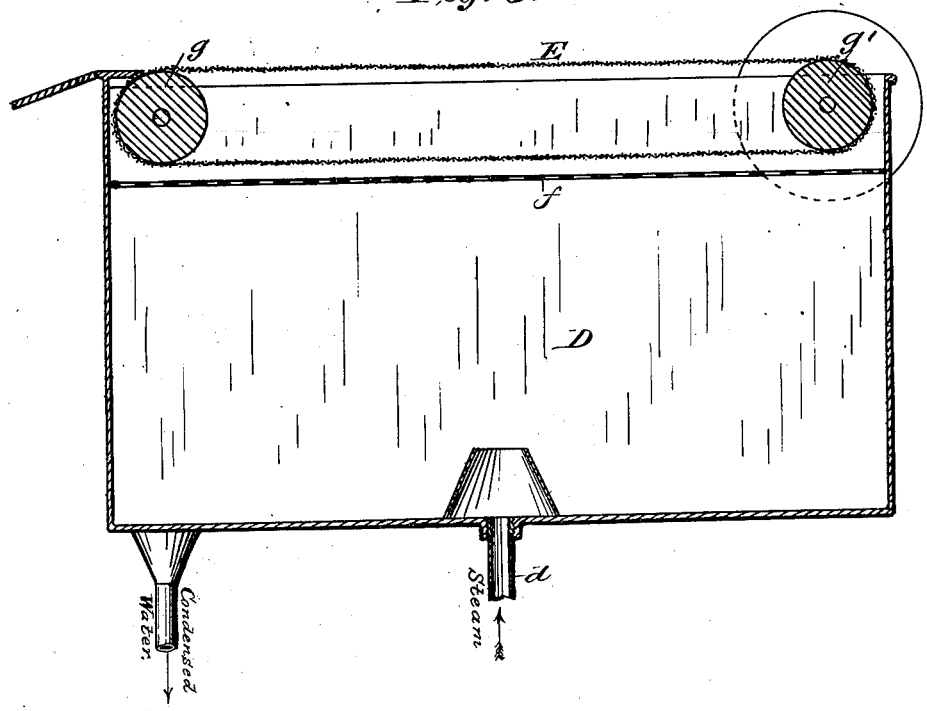
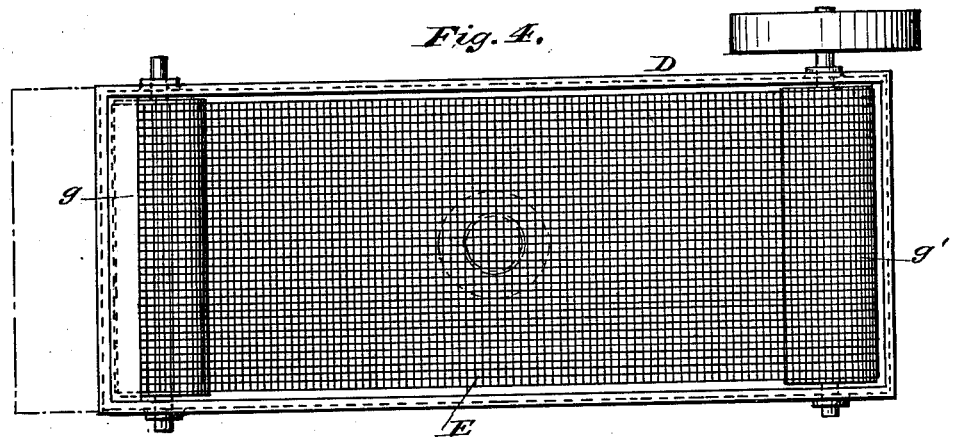
WITNESSES
INVENTORS:
Charles Hemje &
Theodore C. Brecht,
By T. C. Brecht,
Attorney

UNITED STATES PATENT OFFICE.

CHARLES HEMJE AND THEODORE C. BRECHT, OF WASHINGTON, D. C.

PROCESS OF AND APPARATUS FOR COMPRESSING PLASTIC AND OTHER MATERIALS.

SPECIFICATION forming part of Letters Patent No. 261,228, dated July 18, 1882.

Application filed June 20, 1882. (No model.)

*To all whom it may concern:*

Be it known that we, CHARLES HEMJE and THEODORE C. BRECHT, citizens of the United States, residing at Washington city, District of Columbia, have invented certain new and useful Improvements in Process of and Apparatus for Compressing Plastic and other Materials; and we do hereby declare the following to be a full, clear, and exact description of the invention, such as will enable others skilled in the art to which it appertains to make and use the same.

Our invention relates to an improved process and apparatus for compressing plastic and other materials; and the object of our invention is to produce an apparatus and process for forming cakes, cubes, cylinders, or other shaped articles from pure dry materials, and producing on the surface of said articles a cemented crust or film of the same material, which will enable them to be handled without breaking, and among other articles, confections, or lozenges, we can apply our process with advantage to bicarbonate of soda or other alkalies for introducing them into casks, barrels, or vessels containing beer and other malt liquors, sparkling wines, and other effervescent liquors, for the purpose of increasing the life of such liquids, and so that when said lumps or cakes are dropped into the vessel containing the liquid the carbonic acid evolved from the lumps or cakes will permeate the entire body of the liquid, and at the same time the quantity of alkaline matter introduced into a certain quantity of liquid can be controlled. Together with the alkaline lumps or cakes may be used lumps of tartaric or combinations of two or more such other suitable acids or alkalies compressed in a similar manner as the alkaline lumps, so that the amount of carbonic acid evolved from said lumps can be easily kept under control and regulated as desired. The usual manner of applying such articles—by brewers, for instance—is to introduce about one ounce of the bicarbonate of soda to each quarter-barrel with a spoon—the powdered bicarbonate employed—and it is obvious that this manner of operating causes a great deal of irregularity, as too much bicarbonate of soda will impart to the beer an alkaline taste, while too little will leave it acid. A great deal of the alkaline powder, on being placed into the barrel, will float on the surface of the liquid and immediately evolve carbonic acid, a large part of which is lost, together with the beer thrown out by the action of the acid, before the barrel can be closed, while at the same time a large quantity of the article was spilled and wasted in handling.

Our invention consists in either first compressing the bicarbonate of soda or other alkali or tartaric acid, sal-soda, &c., in suitable molds, and then applying to the article a bath of steam, so as to form a thin crust or film of the same material, or the articles may be subjected to the bath of steam beforehand, thereby very slightly dampening them, and then compressing them; or to better preserve the articles they may be subjected to a bath of steam saturated or impregnated with gum-arabic or similar material, by which a crust is applied, and they will not lose their effervescent qualities.

We have shown an apparatus by which cakes or blocks of carbonate of soda can be molded as well as steamed; but we do not confine ourselves to any particular kind of apparatus, as many different ways and devices can be suggested without departing from the spirit of our invention.

Figure 2:
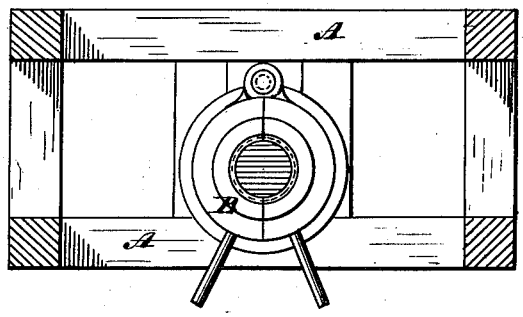

In the accompanying drawings, Figure 1 is a side elevation of a compressing-mold. Fig. 2 is a horizontal section on line *x x*. Fig. 3 is a longitudinal section of the steaming apparatus. Fig. 4 is a plan view of the same.

In the drawings, A represents a suitable frame, in which is arranged a mold, B, which may be of any suitable size or configuration to suit the purpose. Above this mold is placed a screw, C, or a cam or other device, by which the plunger *c* is forced down on the article in the mold and compresses it. The mold is preferably lined with glass, porcelain, &c., to prevent the articles from sticking or adhering to the sides.

A steaming apparatus is shown in Figs. 3 and 4, which consists of a suitable casing or box, D, having an inlet, *d*, for steam and an outlet, *e*, for condense-water. In the upper part of this casing is arranged preferably a sheet-metal perforated partition, *f*, to distribute the steam which passes up against the cakes, &c., which are placed upon an endless apron, E, made preferably of wire-cloth, and passing over suitable rollers, $g$ $g'$, which receive motion from any power, either hand or steam. A cover may be arranged over the casing, if desired.

We are aware that bicarbonate of soda or other alkali has been compacted with cement; but this is objectionable, as the bicarbonate of soda loses considerable of its effervescence when so prepared, and it has also been demonstrated by actual tests that such lumps or mixture would not be dissolved after being placed several days in the liquid, and would therefore not accomplish the result intended, and we therefore disclaim such mixture; but,

Having thus described our invention, what we claim, and desire to secure by Letters Patent, is—

1. The process herein described of compressing the materials herein named, or combination of such materials, into cakes, cubes, &c., and subjecting them to a bath of steam, substantially as and for the purpose specified.

2. As a new article of manufacture, cubes, cakes, &c., of bicarbonate of soda or other equivalent materials, compressed in suitable molds, and having a cemented crust or film of the same material, substantially as set forth.

In testimony whereof we hereby affix our signatures in presence of two witnesses.

CHARLES HEMJE.
THEO. C. BRECHT.

Witnesses:
 JULIUS JONSON,
 LLOYD F. KELEHER.